Feb. 25, 1947.  W. O. BECHMAN  2,416,564
GUIDE FOR TRACK SHOES OR LINKS
Filed April 2, 1945
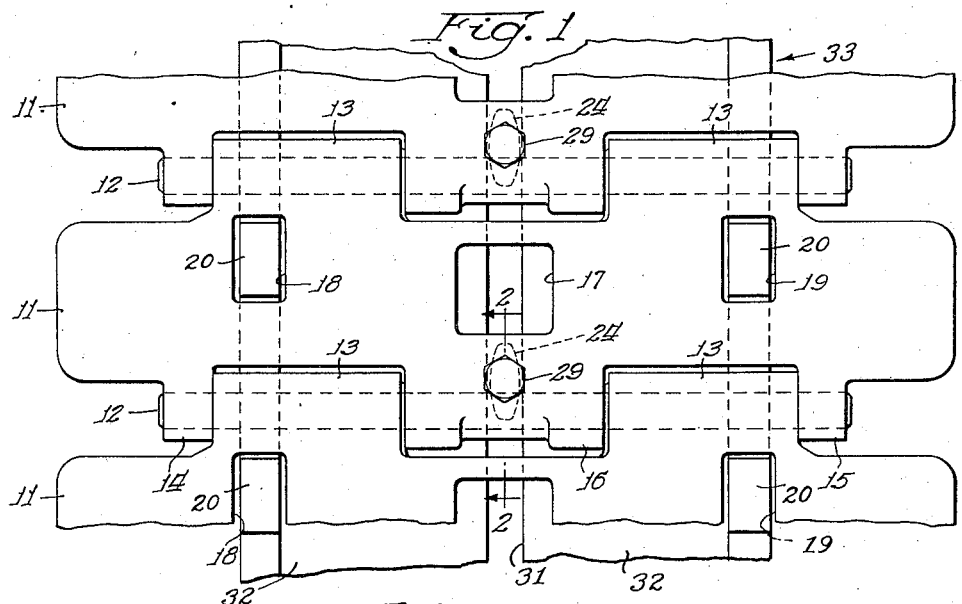
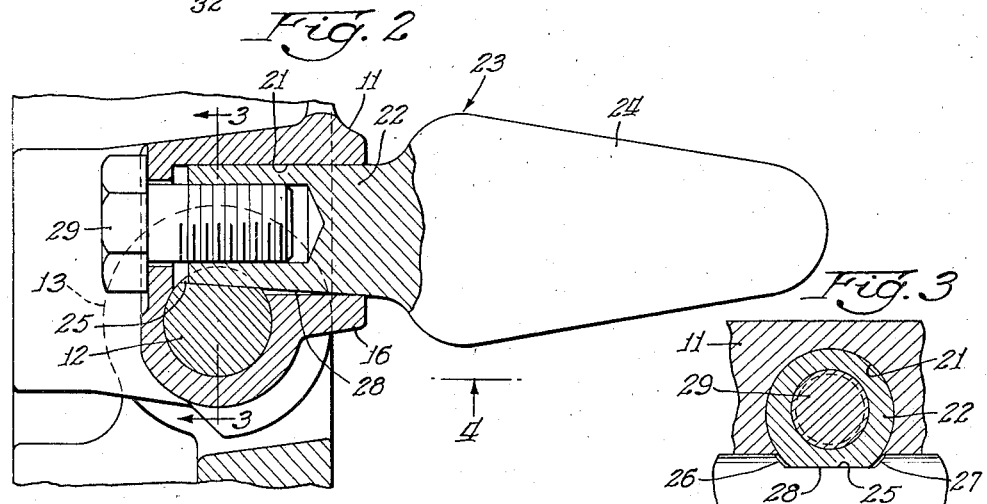
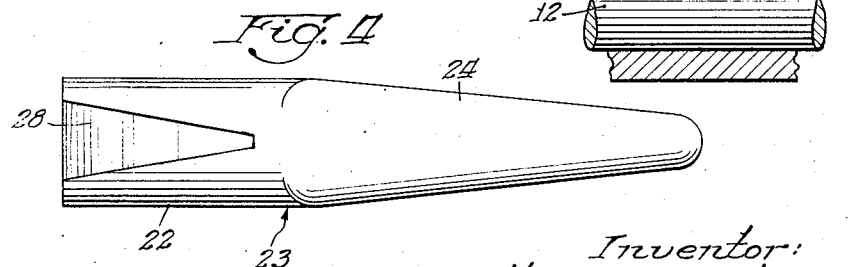
Inventor:
William O. Bechman
By: Paul O. Pippel
Atty Patented Feb. 25, 1947

2,416,564

UNITED STATES PATENT OFFICE 2,416,564

GUIDE FOR TRACK SHOES OR LINKS

William O. Bechman, Chicago, Ill., assignor to International Harvester Company, a corporation of New Jersey Application April 2, 1945, Serial No. 586,213

5 Claims. (Cl. 305—10)

This invention concerns articulate tracks of crawler type vehicles and relates more specifically to a track guide assembled with the track shoes or links to project into grooved or slotted means for retaining the track on the vehicle.

The invention constitutes an improvement upon a type of track structure in which the track links have integrally-formed track guide studs projecting from the inner faces thereof (the faces opposite to the earth-engaging or traction faces) into spaces between axially-spaced portions of track rollers, drivers and idlers to retain the track thereon as the track links pass thereover.

One object of the invention is the provision of a simpler track shoe or link which may be formed and assembled with a separate guide at less cost than when these parts are produced integrally. Coupled with this object is the advantage that impaired guide members can be detached from the link and replaced with less effort and expense than if the entire link and guide assembly were replaced.

Another object is the provision of an improved track link and guide member assembly wherein the hinge pin of adjacent links serves as an abutment for holding the guide in a predetermined circumferential setting.

A further object is the provision of a link and guide assembly in which the guide serves as a stop to prevent endwise withdrawal of the hinge pin for associated adjacent links.

A further object is the provision of a link and guide assembly combining the advantages of the next preceding two objects.

The drawings and the following description will render the above objects and other desirable objects inherent in and encompassed by the invention more fully comprehendable.

In the drawing:

Fig. 1 is a fragmentary plan view of the outer or ground-engaging periphery of a crawler vehicle track of which the links and track guide members assembled therewith constitute a preferred embodiment of this invention;

Fig. 2 is a sectional view taken on the line 2—2 of Fig. 1;

Fig. 3 is a sectional view taken on the line 3—3 of Fig. 2; and

Fig. 4 is an end elevational view of the track guide members which are respectively assembled with the track links or shoes.

In the present embodiment, the articulately connected members 11 constitute the links of a vehicle track as well as the shoes or ground-engaging portions thereof. These members 11, which for convenience will be referred to as links or track link structures, are pivotally connected at their opposite edges to adjacent similar links by hinge pins 12. At one edge, each link has pin-receiving means in the form of a pair of axially spaced bearings 13, while at the opposite edge each of these links has pin-receiving means in the form of axially spaced bearings 14, 15, and 16. The bearings 14 and 15 are spaced sufficiently from their associated coaxial bearing 16 for receiving the bearings 13 of the adjacent link so that each group of bearings 13, 14, 15, and 16 is axially alineable for receiving its associated pin 12.

Each link is also provided with an extrusion opening 17 for the discharge of earth or other foreign matter from the inner periphery of the track to the outer periphery thereof, so that an accumulation of this foreign material on the inner periphery will not attain proportions for jamming against the track driving sprockets and/or rollers. Holes 18 and 19 are for receiving teeth 20 of track driving sprockets 33.

Each link 11 also has a socket 21 for receiving the shank 22 of a track guide member 23 having a flattened head 24 shaped as illustrated in Figs. 2 and 4. Referring to Figs. 2 and 3 where the socket 21 of the center link 11 in Fig. 1 is shown, this socket can be seen to communicate completely through the link at the base of the bearing 16. This places the socket 21 in such close adjacency to the pin-receiving means consisting of the bearings 14, 15, and 16 that the inserted shank 22 projects into the circular profile of the associated hinge pin 12. Therefore, the hinge pin is formed with a flat bottom notch 25 for accommodating the guide member shank 22, and said pin is inserted prior to insertion of said shank into the socket 21. Subsequent to insertion of the shank into said socket, the shank body will cooperate with ends 26 and 27 of the notch 25 in blocking endwise movement of the pin and thereby preclude endwise withdrawal of the pin 12 from its assembly with the adjacent links.

The guide member shank is provided with a flat face 28 so located circumferentially thereof that when this face abuts against the flat bottom of the notch 25, the guide member head 24 will be oriented within a plane extending lengthwise of the track as illustrated by the dotted outlines of these heads 24 in Fig. 1. Guide member heads 24 are made flat and thus thin in the one dimension so they are receivable within a circumferential groove 31 between axially-spaced members 32 of their associated driver sprocket 33 and within corresponding grooves, not shown, within the peripheries of the idler sprockets, of the tractor track rolls, and of the track bogie wheels. The greater dimension of the guide member heads 24 lengthwise of the track is for providing sufficient mass to provide the required strength.

The track guide member shanks are anchored in their sockets 21 by cap screws 29 which project into the sockets from the traction face of their associated links 11 and are turned into threaded relation with threaded recesses of the guide member shanks.

Having thus described the preferred embodiment of the invention with the view of fully illustrating the same, I claim:

1. In an articulate vehicle-track carried about axially-spaced rotatable members of the vehicle, a track link structure having pin-receiving means for the reception of a hinge pin to pivotally connect said link structure with an adjacent link structure and also having a socket intersecting said pin-receiving means, a hinge pin inserted endwise into said pin-receiving means and having a notch in a side thereof disposed in registry with said socket, and a track guide member extending outwardly from said link structure for projecting between the axially-spaced rotatable members to retain the track on the vehicle and having a shank inserted into said socket and into said notch of the hinge pin to prevent endwise withdrawal of the pin from its receiving means.

2. In an articulate vehicle-track carried about axially-spaced rotatable members of the vehicle, a track link structure having pin-receiving means for the reception of a hinge pin to pivotally connect said link structure with an adjacent link structure and also having a socket intersecting said pin-receiving means, a hinge pin inserted endwise into said pin-receiving means, and a track guide member having a head portion extending outwardly from said link structure for projecting between the axially-spaced rotatable members and cooperating therewith to retain the track on the vehicle, said head portion requiring circumferential orientation for cooperating with said rotatable members, said track guide member also having a shank anchored in said socket, and said shank having a flattened portion reactable against the hinge pin to prevent rotation of said guide member to preserve the orientation of its head.

3. In an articulate vehicle-track carried about axially-spaced rotatable members of the vehicle, a track link structure having pin-receiving means for the reception of a hinge pin to pivotally connect said link structure with an adjacent link structure and also having a socket intersecting said pin-receiving means, a hinge pin inserted endwise into said pin-receiving means and having a flat bottom notch in a side thereof disposed in registry with said socket, and a track guide member having a head portion extending outwardly from the link structure for projecting between the axially-spaced rotatable members and thereby cooperate therewith in retaining the track on the vehicle, said head portion requiring orientation circumferentially of said guide member to facilitate such cooperation with the axially-spaced members, said track guide member also having a flat faced shank inserted into said hinge pin notch to prevent endwise withdrawal of the pin from its receiving means, and the flat face of said shank being seated against the flat bottom of the pin notch to prevent rotation of the guide member and thereby preserve the orientation of its head.

4. In an articulate vehicle-track movable along a groove of retaining means for holding the track on the vehicle; a track link structure having pin-receiving means extending transversely thereof for the reception of a hinge pin to pivotally connect said structure with an adjacent link structure and also having a socket extending normally thereto adjacently to said pin-receiving means; a hinge pin inserted endwise into said pin-receiving means and having, in a side thereof, a notch in registry with said socket; and a track guide member having a shank portion anchored in said socket and a head portion extending outwardly from the structure for projection into the groove of said retaining means to cooperate therewith in retaining the track on the vehicle, said track guide member being circumferentially orientated for such cooperation with the track-retaining means and the shank of said guide member having a section projecting into the pin notch to cooperate therewith in maintaining such circumferential orientation and in blocking endwise withdrawal of the pivot pin.

5. In an articulate vehicle-track movable along a groove of retaining means for holding the track on the vehicle; a track link structure having an outer traction face, an inner opposite face, a socket communicating between said faces, and pin-receiving means extending transversely of said structure along an edge thereof adjacently to said socket for the reception of a hinge pin to pivotally connect said structure with an adjacent link structure; a hinge pin inserted endwise into said pin-receiving means and having, in a side thereof, a notch in registry with said socket; a track guide member having an internally-threaded shank projected into said socket from said inner face of the link structure and a head portion extending outwardly from said face for projection into the groove of said retaining means to cooperate therewith in retaining the track on the vehicle, said track guide member being circumferentially orientated for such cooperation with the track-retaining means and the shank of said guide member having a section projecting into the pin notch to cooperate therewith in maintaining such circumferential orientation and in blocking endwise withdrawal of the pivot pin; and a threaded member projecting into said socket from the outer face of said link structure into threaded relation with the internal threads of said shank to anchor the same in said socket.

WILLIAM O. BECHMAN.

REFERENCES CITED

The following references are of record in the file of this patent:

UNITED STATES PATENTS

| Number | Name | Date |
|---|---|---|
| 1,376,851 | Worth | May 3, 1921 |
| 1,135,560 | Tolles | Apr. 13, 1915 |
| 1,881,179 | Foot | Oct. 4, 1932 |